United States Patent Office 3,740,269
Patented June 19, 1973

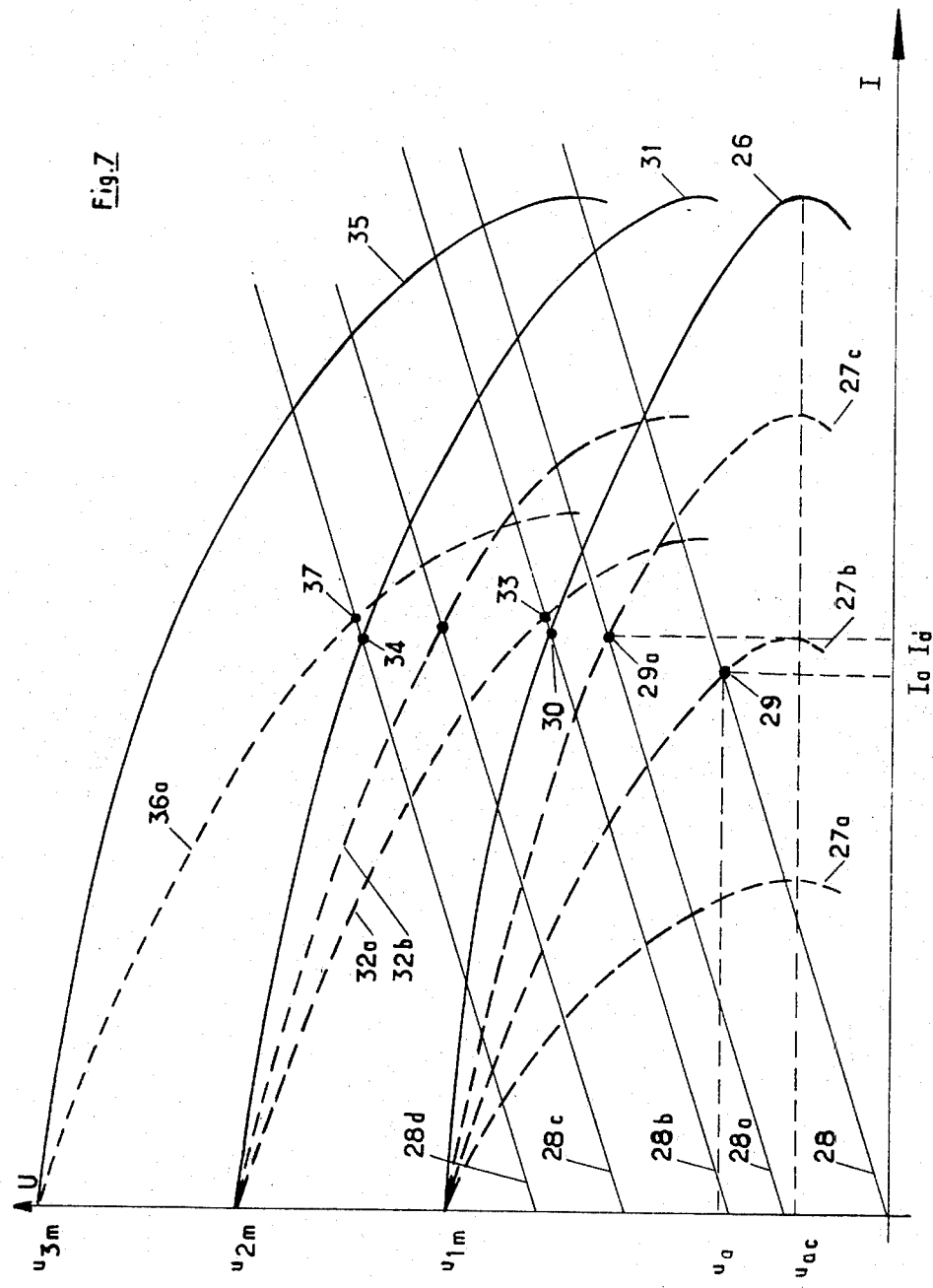

3,740,269
PROCESS AND EQUIPMENT FOR REGULATING THE OUTPUT OF A SET OF FUEL CELLS
Pierre Patin, 58 Rue de Sevres 92,
Boulogne-sur-Seine, France
Continuation-in-part of abandoned application Ser. No. 76,791, Sept. 30, 1970. This application Mar. 22, 1972, Ser. No. 237,006
Int. Cl. H01m 27/00
U.S. Cl. 136—86 E                            5 Claims

ABSTRACT OF THE DISCLOSURE

The output of fuel cells fed by a forced flow of each reactant dissolved or emulsified in a dilute electrolyte with a constant concentration is regulated by electrically connecting the cells in series and continuously supplying each electrolyte charged with the corresponding reactant to the first cell and supplying the other cells with each electrolyte with its reactant at a low rate of flow and progressively supplying said other cells in parallel at a relatively high rate of flow of each electrolyte with its reactant as soon as the loss of charge through said other cells reach predetermined values.

REFERENCE TO RELATED APPLICATION

The present invention which is a continuation-in-part of the earlier filed pending application Ser. No. 76,791, filed by applicant Sept. 30, 1970, abandoned, which relates to fuel cells fed by a forced flow of each reactant dissolved or emulsified in a dilute electrolyte with a constant concentration, and more particularly to a process and equipment for operating a set of fuel cells to control the power output.

BACKGROUND OF THE INVENTION

Among the fuel cells currently being produced, there are certain types fed by a forced flow of each reactant dissolved or emulsified in a dilute electrolyte with a constant concentration, in which it is possible to vary the relationship between the voltage and the current strength in dependence upon the rates of flow of the electrolytes respectively charged with the reactants. However, the families of relations thus obtained do not permit such cells to be directly used, by simply varying the electrolyte flow rates, for applications in which one of the terms of the relation must remain substantially constant, at least for a certain space of time, such as is particularly the case when cells of this kind are used for the propulsion of vehicles and, more generally, for supplying a device having a utilization parameter which can be varied in a substantially linear manner.

With a view to remedying this shortcoming, the present invention provides a process of regulating the output of a set of fuel cells of this type supplying a device having a utilization parameter which is variable in a substantially linear manner, and requiring, at least momentarily, that the current supplied by the said set should have a quasi-constant strength under a variable voltage.

SUMMARY OF THE INVENTION

In accordance with the invention there is provided a process of regulating the output of a set of fuel cells of this type arranged to supply a device having a utilization parameter which is variable in a substantially linear manner, and requiring, at least momentarily, that the current supplied by the said set should have a quasi-constant value, which process comprises connecting the cells of the set electrically in series, continuously supplying each electrolyte charged with the corresponding reactant to the first cell and, at a low rate of flow, to the other cells under a determined loss of charge, and progressively supplying each electrolyte with its reactant to the said other cells in parallel, with a relatively high rate of flow, as soon as the losses of charge through the successive cell units thus obtained reach predetermined values in dependence upon the said variable utilization parameter.

The parallel supply of the cells at a relatively high flow rate of the electrolytes with their reactants, according to this process, may increase or decrease progressively in order to produce progressive or declining grouping of active cells in the set.

This progressive, parallel supplying of electrolytes to the cells, according to this process, is preferably obtained by varying the rate of supply under the effect of a quasi-linearly variable utilization parameter which can be converted into electrical voltage.

Utilization parameters of this kind which can be varied in a quasi-linear manner and converted into electrical voltage, belong, in particular, to the group of physical quantities which includes speed, acceleration, pressure, flow, viscosity, stress, temperature, quantity of heat, light intensity, quantity of radiation, magnetic induction, etc.

In accordance with the invention there is further provided apparatus which enables the process specified above to be put into effect, said apparatus comprising an electric motor pump for supplying each electrolyte with its reactant in parallel to the cells in the set, the cells being connected electrically in series, the intake of the motor pump being connected to the outlets of the said cells for said electrolyte, and its outlet being permanently connected to the inlet for said electrolyte of the first cell of the set and connected to each inlet of the succeeding cells for said electrolyte through a corresponding calibrated passage generating a determined loss of charge, preset valves which are normally closed which open at a preset pressure level and which connect the inlet of each succeeding cell for said electrolyte to that of the preceding cell, and means for supplying electrical power to said motor pump at a voltage which is a function of the quasi-linearly variable utilization parameter of a device supplied by the said cells, which utilization parameter is variable in a quasi-linear manner.

The invention finally has as object the industrial applications of the process and equipment specified above, for the purpose of supplying, by means of fuel cells of this type, any device having a utilization parameter which can be varied in a substantially linear manner and converted into electrical voltage, and requiring, at least momentarily, that the current supplied by the said cells should have a quasi-constant strength, in the heating, electrical, chemical, nuclear and mechanical spheres and, more particularly in this latter sphere, for the supply of propulsion motors of terrestrial, aquatic or aerial vehicles.

To summarize, the present invention has the aim of incorporating, in the fuel cells of this type, devices based on the utilization of losses of charge within the electrolytes, and makes it possible to directly regulate the utilization parameter of the device supplied by said cells by acting solely upon the rate of flow of the electrolytes.

REFERENCE TO THE ACCOMPANYING DRAWINGS

The invention will now be particularly described, by way of example, with reference to the accompanying drawings, in which.

Figure 3:
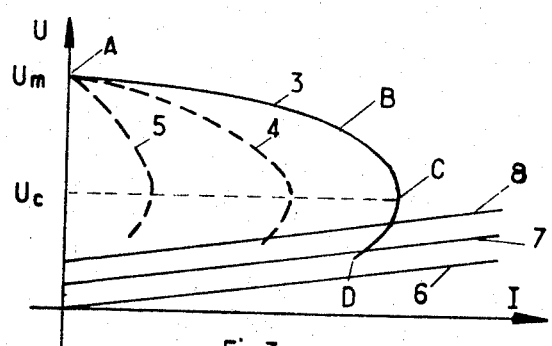
FIG. 3 illustrates the voltage/current strength relationship of the set in FIG. 2 at full flow and at reduced flows of each electrolyte and the same relationship for a propulsion motor supplied by this set of cells, at zero and increasing speeds.
Figure 4:
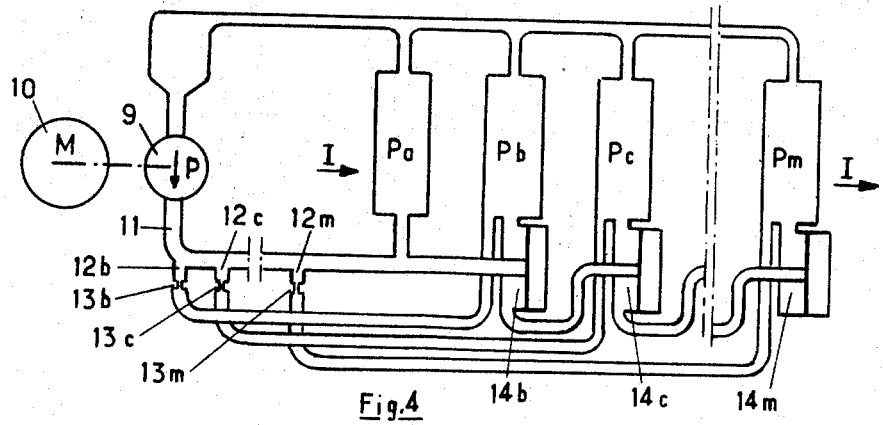
Figure 5:
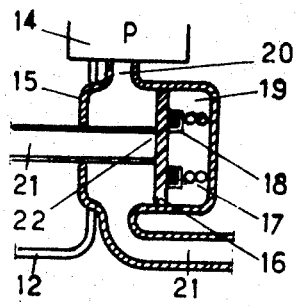
Figure 6:
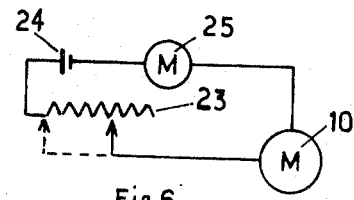

FIG. 4 diagrammatically illustrates the apparatus for the implementation of the process of energy regulation according to the invention and shows how said equipment is supplied with each electrolyte;

FIG. 5 is a schematic diagram of one of the preset valves of the embodiment of FIG. 3;

FIG. 6 is a diagram showing how the motor driving the pump in the apparatus of FIG. 4 is supplied; and FIG. 7 illustrates the voltage/current strength relationship of the set in FIG. 4 at increasing and reduced electrolyte flow rates and the same relationship for a propulsion motor supplied by this set, at speeds increasing from zero.

DESCRIPTION OF THE PREFERRED EMBODIMENTS

Figure 1:
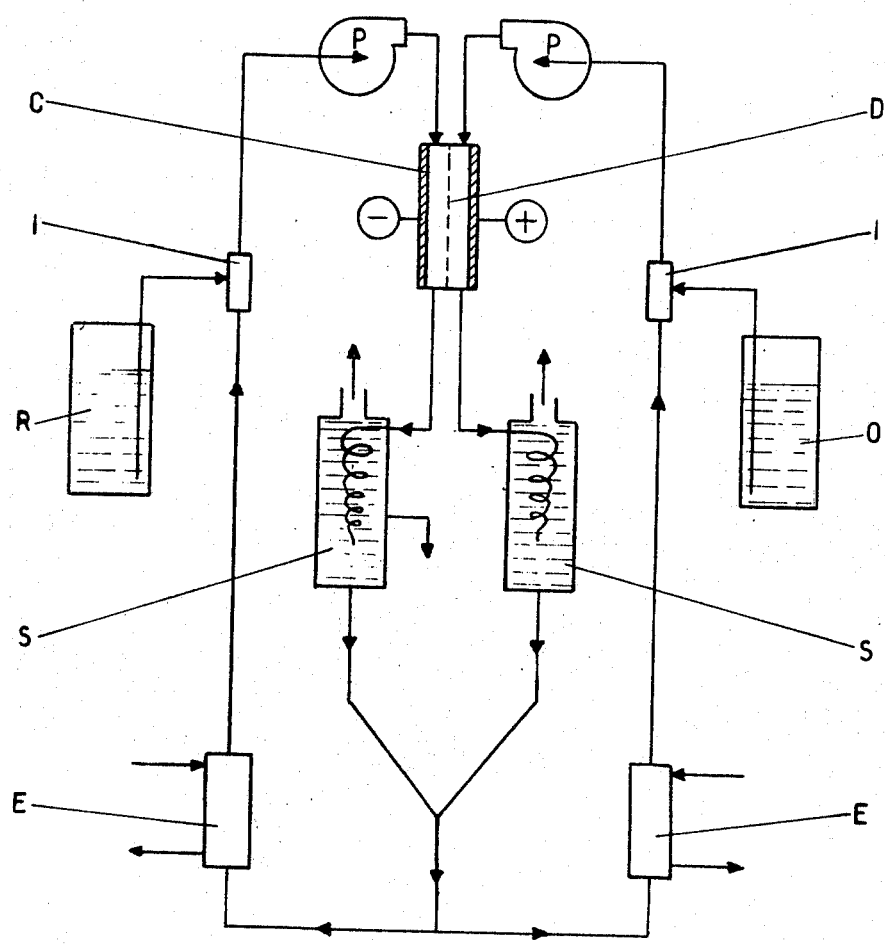
FIG. 1 is a schematic diagram of a conventional fuel cell with a two-loop closed electrolyte cycle.

The conventional fuel cell C illustrated in FIG. 1 is divided into two half-cells by a semi-permeable diaphragm D with two non-porous electrodes on either side. Each half-cell is supplied by means of a pump P with a forced through flow of each reactant dissolved or emulsified in a dilute electrolyte. The reactants contained in the reducer tank R and the oxidant tank O, respectively, are injected by means of injectors I into their respective electrolytes in order to obtain a constant concentration of each reactant at the inlet of cell C. The electrolytes crossing the cell form a two-loop closed electrolyte cell. At the outlet of the cell, the electrolytes rendered poorer in reactants pass through gas-liquid separators S. After that they are mixed for new homogenization and cross heat-exchangers E.

For the sake of clarity only one loop of electrolyte charged with the corresponding reactant has been illustrated in the following figures and subsequently described in the specification.

In practice, a fuel cell is made up of a number of modular construction elements similar to those of FIG. 1 which may be connected in series or in parallel. A number of these elements connected in series constitutes a poly-element which will be referred to as an "elementary cell." In order to simplify the explanation, consideration will henceforth be given only to groups of elementary cells $P_1$, $P_2$ ... $P_n$ (FIG. 2) which are connected electrically in series in sufficient number to produce the desired maximum voltage $U_m$. The same current I, the maximum value of which is $I_m$, passes through all these elementary cells.

Figure 2:
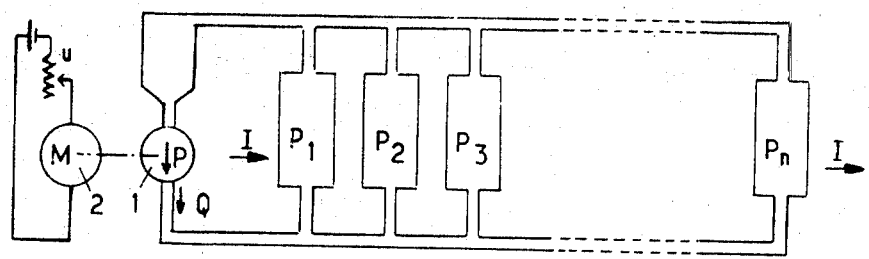
FIG. 2 is a diagrammatic illustration of a set of elementary fuel cells of the type specified above showing how they are conventionally supplied with each electrolyte.

Generally speaking, cells of this kind are supplied with each electrolyte in parallel by a single motor pump, pump 1, the output Q of which can be varied by regulating the voltage $u$ of the motor 2 which drives it (FIG. 2). In each electrolyte circuit, there are disposed various devices for keeping up its content of the corresponding reactant and for eliminating waste produced by reaction. Therefore, at the inlet of such fuel cells the electrolyte has a constant concentration of reactants. For reasons of simplification, these devices, which do not come within the scope of the present invention, have not been illustrated.

The voltage/current characteristics or relationships of a unit of this kind may be illustrated as in FIG. 3. The curve 3 is the characteristic of the group in FIG. 1 at the full electrolyte flow rate Q. This curve comprises a first, normal functioning part AB, the set supplying its maximum power for the flow rate Q, at B. Then the voltage of the set diminishes rapidly in the second part, BC, of the curve 3, until the critical voltage $U_c$ is reached at the point C, and the voltage continues to decrease as also does the current, in the third part, CD, of the curve 3, which part CD must be disregarded for practical purposes.

The curves 4 and 5 represent the characteristics of the set in FIG. 2 at reduced flow rates. It will be found that they are deduced fairly roughly from the curve 3 by unamorphosis parallel to the current axis. The result of this is that the critical voltage $U_c$ is substantially the same at a reduced flow rate and at full flow rate.

It is this phenomenon which causes the difficulty in directly using this type of cell, by regulation of the flow rate of the electrolytes, for the supply of a device having a utilization parameter which can be varied in a quasi-linear manner, such as a propulsion motor for a terrestrial, aquatic or marine vehicle. In fact the impeding force of a propulsion motor may be represented by a formula such as:

$$V = RI + kv$$

where R is the internal resistance of the motor, $v$ its speed and $k$ a constant. Diagrammatically, therefore, the characteristics of a motor of this kind are parallel straight lines 6, 7, 8 ... corresponding to speeds O, $v_1$, $v_2$ ... (FIG. 3).

It appears from FIG. 3, that in a large set of fuel cells, such as that in FIG. 2, the characteristic 6 of the propulsion engine at zero speed does not intersect the characteristics 3, 4, 5 of the set of cells within a utilizable zone, such as the zones AB or BC of the curve 3. One would then be persuaded to break down the set into elementary cells each having a critical voltage considerably lower than $U_c$, which cells could be connected together in series. This grouping could obviously be effected with the aid of contactors, but in that event each elementary cell must include its own equipment for supplying the electrolytes charged with reactants, purification, cooling, etc.

The embodiment of FIG. 4 provides, in a simple manner, for progressive grouping, in series, of the elementary cells of a set of fuel cells, through the action of the electrolyte supply to the cells.

For this purpose, as illustrated in FIG. 4, in the set of elementary cells $Pa$, $Pb$ ... $Pm$ constituting the electrical generator of a vehicle, the elementary cells are electrically connected in series and consequently have the same current passing through them. They are supplied with each electrolyte charged with the corresponding reactant by a pump 9 driven by an electric motor 10. The intake of the pump 9 is connected to the outlets of the cells for the electrolyte, while its output is permanently connected to the input of the first cell $Pa$ for the electrolyte by a duct 11 having tappings $12b$, $12c$ ... $12m$ to supply the cells $Pb$, $Pc$ ... $Pm$ continuously and at a low electrolyte flow rate, through calibrated passages $13b$, $13c$ ... $13m$ which create a determined loss of charge at the corresponding tappings. The cells $Pb$, $Pc$ ... $Pm$ are also supplied with the electrolyte through a system of normally closed preset valves $14b$, $14c$ ... $14m$, which opens at a preset pressure level. Said valves 14 are disposed in a cascade arrangement and each connect the inlet of one cell for the electrolyte to that of the preceding cell.

Each preset valve 14 (FIG. 5) has a cylindrical valve body 15 to which is attached a flexible circular membrane 16 held against a spring 17, a metal washer 18 being interposed between the membrane 16 and the spring 17. The chamber 19 in the bottom of the valve is hermetically sealed and full of air. The valve body 15 is connected by a neck 20 to the inlet of the cell P for the corresponding electrolyte and by a tube 21 to the valve body of the next cell. The tube 21 leading from the preceding preset valve and disposed in the axis of the valve body 15, has an orifice 22 with a diameter which is distinctly smaller than that of the valve body 15, i.e. of the membrane 16, and is normally obturated by membrane 16. Because of the differences in area between the orifice 22 and the membrane 16, if orifice 22 opens for an electrolyte pressure $Po$, it closes again only for an electrolyte pressure $P_b$ which is distinctly less than $P_o$. This device also makes it possible to avoid the instability phenomenon known as "pumping."

Motor 10 driving pump 9 is supplied at a voltage $u$ which is regulated as indicated in FIG. 6. This voltage is taken from a potentiometer 23 controlled by an accelerator control of the vehicle and supplied from two electric generators 24 and 25 in series. Generator 24 has an independent conventional electric battery supplying a constant voltage $u_o$, whereas generator 25 is a tachometric dynamo supplying a voltage $kv$ which is proportional to the speed $v$ of the vehicle. The voltage $u$ therefore lies between the value $o$ and a maximum value:

$$u_m = u_o + kv$$

whereas the flow rate Q of the pump lies between value $o$ and a value which is proportional to $u_m$.

The functioning of the equipment illustrated in FIGS. 4 to 6 is as follows:

The number and no-load voltage of the elements in each elementary cell being judiciously selected as a function of the characteristics of the vehicle, a maximum voltage $U_{1m}$ corresponds to the functioning of the elementary cell $Pa$ alone, a maximum voltage $U_{2m}$ corresponds to the series functioning of the cells $Pa$ and $Pb$, and so on; the maximum current supplied by any one of the units of cells in series is always $I_m$.

When an elementary cell P is normally supplied with electrolytes charged with reactants by preset valves 14 for the two electrolytes, it supplies a voltage which is not zero. When, on the other hand, it is supplied only by the corresponding calibrated passages 13, it supplies a substantially zero voltage, but the calibrated passages 13 are, as a general rule, determined in such a way that the internal resistance of the cell is likewise negligible. However, these calibrated passages could be selected in such a way that this internal resistance has a specific value which is added to the internal resistance of the propulsion motor for the purpose of facilitating starting up like a rheostat. The minimum electrolyte flow rates supplied by the calibrated passages 13 for the two electrolytes also has the function of eliminating the calories resulting from the passage of the current I through the cell, the electrolytes also being cooled by an exchanger which is incorporated in the common circuit and which is not illustrated since it does not form part of the invention.

At the starting, since the characteristic at full flow rate $q_1$ for the electrolytes of the cell $Pa$ alone is the curve 26 (FIG. 7), its characteristics at reduced flow rates are represented by the curves 27a, 27b, 27c. The characteristic 28 of the propulsion motor at zero speed cuts at least one of these curves 27b at a point 29 in respect of which the voltage $u_a$ supplied by the cell $Pa$ is greater than the critical voltage $u_{ac}$ of this cell and the current $I_a$ is sufficient to effect starting-up.

From this moment onwards, as the speed of the propulsion motor becomes non-zero and increases, the characteristic 28 will be displaced at 28a in parallel with itself, whereas the characteristic 27b, as a result of the increase in the flow rates of the electrolytes charged with reactants with the speed, is modified parallel to the current axis and the functioning point is displaced at 29a corresponding to a current $I_d$, and this occurs up to the moment at which the flow rate $q_1$ for the electrolytes, corresponding to the characteristic 26 for the cell and to the characteristic 28b for the motor, is attained. These curves intersect at a point 30 which corresponds to a current which differs little from $I_d$.

At this moment, with the speed of the propulsion motor continuing to increase, the flow rates of the pumps 9 for the electrolytes likewise increase, as do the losses of charge through the cell $Pa$. The pressure upstream of $Pa$ then exceeds the value which opens each preset valve 14b and the corresponding electrolyte flow rate is then distributed between the cells $Pa$ and $Pb$ in series.

The characteristic of the unit $Pa+Pb$ at the full flow rate $q_2$ for the electrolyte being a curve 31 (FIG. 7), that of the said unit at the triggering flow rate is a curve 32a which is derived from the curve 31 and which cuts the curve 28b of the motor at a point 33. Point 33 may be close to the point 30, if the ratio of the no-load voltages $Pb$ and $Pa$ is calculated in a suitable manner, and corresponds to an intensity which is little different from $I_d$.

The flow rate of the electrolytes through the unit $Pa+Pb$ continues to increase and the phenomena analysed above are reproduced, first for the characteristics 28c of the motor and 32b of this unit corresponding to a flow rate of electrolytes, and then for the characteristics 28d of the motor and 31 of the unit $Pa+Pb$ at the full flow rate $q_2$ of electrolytes, which intersect at the point 34 which corresponds to a current which is close to $I_d$. Subsequently, each preset valve 14c is opened by reason of the increase in the losses of charge in both cells $Pa$ and $Pb$. The electrolyte flow rates are then distributed between the cells $Pa$, $Pb$ and $Pc$ in series.

The characteristic of the unit constituted by $Pa+Pb+Pc$ at the full flow rate $q_3$ of electrolytes being a curve 35 (FIG. 7), that of the unit at the triggering flow rate is the curve 36a which is derived by an amorphosis from the curve 35. Curve 36a cuts the curve 28d of the motor at a point 37, which may be close to point 34, if the ratio of the no-load voltages of the three cells in series is suitably determined and which corresponds to an intensity which is little different from $I_d$.

The series connection of the cells of the set in units which successively increase in number is continued, using the same process, throughout the entire starting-up period.

Starting-up is thus effected at a substantially constant current which is close to $I_d$. This current is a function of the speed of pump 10 for each electrolyte (FIGS. 4 and 6) regulated by the corresponding rheostat 23 (FIG. 6) but is always increasing, whatever the position of this rheostat, with the speed of the vehicle, as a result of the supply system illustrated in FIG. 6.

On termination of the starting-up operation, the current required for the functioning of the propulsion motor is lower than $I_d$, and the points of functioning at the various speeds draw nearer to the voltages axis. As the speed increases, the process analyzed above is reproduced, thus bringing about the series connection of the cells of the set in units which succesively increase in number. If, on the other hand, the speed decreases, the flow rate of pump 10 for each electrolyte also drops and the cells are successively cut out of the electrolyte circuits by the successive closures of the valves 14. However, taking into account the characteristics of these valves, the separation of a cell from the circuit occurs at a lower speed than its incorporation in the circuit, which permits the use of the unit over a large part of the diagram. The apparatus described may be assisted by a brake for the purpose of stopping the vehicle.

The process and apparatus which have been described above in connection with the supplying of the propulsion motor of a vehicle may be used in all cases where the device to be supplied by a group of fuel cells possesses a quasi-linearly variable utilization parameter and requires, for at least a certain period of time, that the intensity of the current supplied to it should be constant, provided that the said variable utilization parameter can be converted into electrical voltage in order to feed the motor of the customary motor pumps serving to supply electrolytes charged with reactants to the cells.

Utilization parameters of this kind, which can be varied in a quasi-linear manner and converted into electrical voltage, belong, in particular, to the group of physical quantities which includes speed, acceleration, pressure, flow rate, viscosity, stress, temperature, quantity of heat, light intensity, quantity of radiation, magnetic induction, etc. The tachometric dynamo 25 in FIG. 6, which is utilized for speed, is then replaced by a suitable transducer for converting the variable utilization parameter into electrical voltage, such as a piezometric device for pressure, flowmeter for flow rate, thermoelectric device for temperature and quantity of heat, photoelectric cell for light intensity, etc., while the potentiometer 23 is controlled by the means for varying the corresponding utilization parameter.

If the oxidant consist of air, the tank O (FIG. 1) is replaced by a compressor, the output regulation process and apparatus hereinbefore described being utilized only for the loop of electrolyte charged with reducer.

The process and apparatus according to the present invention are particularly applicable to the mechanical, heating, electrical, chemical and nuclear fields.

What I claim is:

1. A process of regulating the output of a set of fuel cells fed by a forced flow for each half cell of each reactant charged in a separate electrolyte solution with a constant reactant concentration and supplying a device with a utilization parameter variable in a substantially linear manner, and requiring at least momentarily, a current supplied by said set having a substantially constant value under variable voltage comprising the steps of electrically connecting the cells of the set in series, continuously supplying each reactant electrolyte solution charged with the corresponding reactant to the first of said half cells, continuously supplying each electrolyte solution at a low rate of flow to the others of said half cells in parallel and progressively supplying the remainder of each electrolyte solution with its reactant to said other half cells in parallel at a relatively high rate of flow as soon as the pressures at the successive others of said half cells reach predetermined values relative to the variable utilization parameter.

2. A progress for regulating the output of a set of fuel cells as claimed in claim 1, including the step of varying the parallel supply of each electrolyte solution to said half cells at relatively high electrolyte flow rates progressively to produce an increase or decrease respectively in the number of cells constituting an active group in the set.

3. A process of regulating the output of a set of fuel cells as claimed in claim 1 including the step of varying the progressive parallel supplying of each electrolyte solution to said half cells by varying the rate of supply as a function of the utilization parameter of the device to be supplied by said set of cells, the parameter being variable substantially linearly and convertible into an electrical voltage.

4. Apparatus for regulating the output of a set of fuel cells fed by a forced flow of each reactant charged in an electrolyte with a constant concentration, comprising an electric motor pump for supplying each electrolyte with its reactant in parallel to said cells in the set, said cells being connected electrically in series, the intake of the motor pump being connected to the outlets of said cells for said electrolyte, and the outlet of said pump being permanently connected to the inlet for said electrolyte of the first cell of said set and connected in parallel to each inlet for said electrolyte of the succeeding cells of said set through a corresponding calibrated passage generating a determined loss of charge, normally closed preset valves opening at a preset pressure level connecting the inlet for said electrolyte of each suceeding cell to that of the preceding cell, and means for supplying electrical power to said motor pump at a voltage which is a function of the substantially linearly variable utilization parameter of a device supplied by said set of fuel cells.

5. Apparatus as claimed in claim 4, wherein each of said present valves comprises a hollow cylindrical body, spring-biased flexible circular membrane in said body, a closed chamber between said membrane and said body, a second chamber in said body connected to the inlet of the respective cell, a tube connecting said second chamber to the valve of the next cell and the open end of the tube from the preceding cell centrally abutting on said membrane and having a diameter smaller than that of said membrane whereby the open end of the tube is normally obturated by the membrane.

References Cited
UNITED STATES PATENTS 3,317,348    5/1967    Winsel _____ 136—86 E
3,644,148    2/1972    Gutbier _____ 136—86 E WINSTON A. DOUGLAS, Primary Examiner H. A. FEELEY, Assistant Examiner